US008851430B2

(12) United States Patent
Mulzer

(10) Patent No.: US 8,851,430 B2
(45) Date of Patent: Oct. 7, 2014

(54) HOLDING ARRANGEMENT

(76) Inventor: Stephan Mulzer, Schliersee (DE)

( * ) Notice: Subject to any disclaimer, the term of this patent is extended or adjusted under 35 U.S.C. 154(b) by 0 days.

(21) Appl. No.: 13/127,675

(22) PCT Filed: Nov. 3, 2009

(86) PCT No.: PCT/EP2009/007869
§ 371 (c)(1),
(2), (4) Date: May 4, 2011

(87) PCT Pub. No.: WO2010/051967
PCT Pub. Date: May 14, 2010

(65) Prior Publication Data

US 2011/0210221 A1 Sep. 1, 2011

(30) Foreign Application Priority Data

Nov. 4, 2008 (DE) ........................ 10 2008 055 823

(51) Int. Cl.
*F16L 3/08* (2006.01)

(52) U.S. Cl.
USPC ............................ 248/74.2; 248/65; 248/68.1

(58) Field of Classification Search
USPC ................. 248/74.2, 68.1, 200.1, 906, 72, 65
See application file for complete search history.

(56) References Cited

U.S. PATENT DOCUMENTS

| | | | | |
|---|---|---|---|---|
| RE15,014 E | | 12/1920 | Stourm | |
| 2,390,945 A | | 12/1945 | Kleinberg | |
| 2,710,694 A | | 6/1955 | Carr | |
| 2,791,325 A | | 5/1957 | Schecter et al. | |
| 2,980,248 A | | 4/1961 | Embring | |
| 3,024,076 A | | 3/1962 | Wulfften | |
| 3,540,687 A | * | 11/1970 | Cuva | 248/223.41 |
| 3,921,948 A | | 11/1975 | Long | |
| 4,119,285 A | * | 10/1978 | Bisping et al. | 248/72 |
| 4,538,782 A | * | 9/1985 | Kirschenbaum | 248/68.1 |
| 4,870,722 A | * | 10/1989 | Shell, Jr. | 24/16 R |
| D375,890 S | * | 11/1996 | Takai | D8/380 |
| 5,593,115 A | * | 1/1997 | Lewis | 248/68.1 |
| 5,921,402 A | * | 7/1999 | Magenheimer | 211/26 |
| 5,957,327 A | | 9/1999 | Whiten | |
| 6,109,569 A | * | 8/2000 | Sakaida | 248/75 |
| 6,109,765 A | * | 8/2000 | Blanton | 362/249.16 |
| 6,161,708 A | | 12/2000 | Myler | |

FOREIGN PATENT DOCUMENTS

| | | | |
|---|---|---|---|
| DE | 195 21 016 | A1 | 12/1996 |
| DE | 29903282 | U1 | 5/1999 |
| FR | 2 494 110 | A1 | 5/1982 |
| WO | 98/01348 | A1 | 1/1998 |
| WO | 2007021969 | A2 | 2/2007 |
| WO | 2008/081274 | A1 | 7/2008 |

OTHER PUBLICATIONS

German Office Action issued in connection with corresponding priority application, Nov. 4, 2009.
International Search Report and Written Opinion issued in connection with corresponding International Application No. PCT/EP2009/007869.

* cited by examiner

*Primary Examiner* — Amy J Sterling
(74) *Attorney, Agent, or Firm* — The H.T. Than Law Group

(57) ABSTRACT

The invention relates to a fixture for objects for providing a secure, space-saving, individually customizable and clearly arranged retaining system for the objects, such as vials and the like, such as for storage and/or transport of the same, wherein at least the holding device for holding at least one object can be attached to the fixture and wherein furthermore fastening means are designed on the fixture in order to fasten the fixture to a frame or the like.

10 Claims, 5 Drawing Sheets

HOLDING ARRANGEMENT

CROSS-REFERENCE TO RELATED APPLICATION

The present application is a U.S. national phase under 35 USC §371 of, and claims priority to international patent application PCT/EP2009/007869, filed on Nov. 3, 2009, which claims priority to German patent application no. 10 2008 055 823.0, filed on Nov. 4, 2008. These applications are incorporated herein by reference in their entireties.

FIELD OF THE INVENTION

The present invention relates to a holding arrangement for at least one holding device for holding at least one object. According to a further aspect, the present invention relates to a holding device for holding at least one object, such as ampoules or the like. Finally, the present invention relates to a framework, to which one or more holding arrangements, in particular to which one or more holding devices are attached, are intended to be fastened.

BACKGROUND OF THE INVENTION

Holding arrangements for ampoules have been known for a long time in the prior art. Such holding arrangements, which are also known as ampoule kits, serve for the safe keeping and transportation of ampoules, containing medical substances, which are usually made of glass and are therefore easily broken. For example, in the field of emergency medicine, the emergency doctor has to carry along such an ampoule kit, which contains ampoules holding circulation medicines, anesthetics and painkillers, etc. The precise stocking and number of required ampoules are selected by the emergency medic depending on the type of application. There are therefore in each case different requirements for different fields of application, for example in mountain rescue or in an ambulance. Therefore, there is great demand for flexible solutions that can be configured individually for putting together ampoules and keeping them for safe storage and transport. On account of the fragility of the ampoules, which are largely also provided with predetermined breaking points, it is very important to keep the ampoules safe, whereby the ampoules do not collide and are not released from their retaining means even in the event of vibrations. In addition, such an ampoule kit must be designed in as space-saving a manner as possible, since, for example, the space in the backpack of an emergency medic employed in mountain rescue is very limited. Such ampoules have varying sizes, and this makes it additionally complicated to fix and retain them. The arrangement of the ampoules also has to be sufficiently clear in order to enable quick access to the correct ampoule and to avoid confusion.

According to solutions known from the prior art, ampoules are held for example by means of loops formed from elastic bands in bags formed as cases. In this way, although it is possible to transport the ampoules relatively safely in a shockproof manner protected against breakage, this wastes a great deal of space. This previously known system is also not flexible, since ampoules can only be arranged where loops are present. In addition, the size of the loop determines the ampoule to be attached at that point. Furthermore, the loop generally also covers the label which is applied to the ampoule and indicates the content of the ampoule. If more slots for ampoules are required than are present, it is not possible to add more. If fewer slots are required than are present, space is wasted unnecessarily.

SUMMARY OF THE INVENTION

It is therefore an object of the invention to avoid the disadvantages of the prior art and in particular to improve a holding arrangement of the type mentioned at the beginning in such a way that it is possible to retain the objects, such as ampoules, for example, in a safe, space-saving, individually adaptable and clearly visible manner, for example in order to keep and/or transport them.

This object is achieved in the case of a holding arrangement of the type mentioned at the beginning in that the at least one holding device for holding at least one object can be attached to the holding arrangement, and in that furthermore fastening means are formed on the holding arrangement in order to fasten the holding arrangement to a framework or the like.

According to a preferred application of the invention, the at least one object is an ampoule, a sign or the like. The invention is particularly advantageous in connection with ampoules, since, as was mentioned at the beginning, a multiplicity of such ampoules of different sizes have to be stored safely in order to keep and transport them, in particular in the field of emergency medicine.

It is further preferred for the holding arrangement to be in the form of a rail or guide. This provides a structurally particularly simple possibility for attaching to the holding arrangement the at least one holding device for holding at least one object.

Advantageously, the holding arrangement has a substantially elongate basic body. This configuration makes it possible in an easy manner to attach a multiplicity of holding devices alongside one another to the holding arrangement.

In a preferred embodiment of the invention, it is preferred for the basic body of the holding arrangement to have a constant cross-sectional profile substantially over its entire length. The constant cross-sectional profile provides easy guidance in order to attach one or more holding devices to the holding arrangement. The cross-sectional profile is constant substantially over the entire length, although is it possible in particular for one end region of the holding arrangement to have a different cross-sectional profile. In this way, a stop for the holding device(s) or a possible way of fastening the holding arrangement to the framework can be realized, for example.

Preferably, the fastening means have first and second fastening devices, wherein the holding arrangement has two opposite, first and second ends, with the first end having the first fastening device and the second end having the second fastening device. The provision of two separate fastening devices, which can be formed in particular also differently from one another, gives rise to particularly stable and flexible fastening of the holding arrangement on a framework or the like.

In order to configure the fastening of the holding arrangement(s) to the framework or the like in as flexible and individually adaptable a manner as possible, it is preferred for the fastening of the holding arrangement to the framework or the like by the fastening means to be detachable fastening.

Preferably, the first fastening device is a fixing device. The first fastening device is preferably a clamping device, which alone is not suitable for safely fastening the holding arrangement to the framework or the like, but merely serves to define the position.

According to a preferred design variant of the invention, the first fastening device has two tongues that are separated by a gap. In this case, the gap is advantageously formed by a material cutout in the holding arrangement.

Advantageously, the cross-sectional profile of the first fastening device corresponds to that of the basic body of the holding arrangement. The cross-sectional profile of the first fastening device is thus designed such that a holding device can be slid or pushed onto the holding arrangement via said first fastening device.

Furthermore, it is preferred for the gap to be arranged approximately centrally in the second end of the holding arrangement. This results in two identically formed resilient tongues, which are compressed by a clamping action and thus can serve for fastening.

The second fastening device is preferably one from the following group: a clamping fastening device, a clip, a clasp, a bracket or the like. In this case, it is particularly preferred for the second fastening device to be a clip which is substantially in the form of a circular portion in longitudinal section, wherein preferably the circular-portion form is somewhat more than a semicircle. This makes secure fastening of the holding arrangement to the framework or the like possible in a simple manner.

It is further preferred for the second fastening device to have a cross-sectional profile that differs from the cross-sectional profile of the basic body of the holding arrangement. In this case, it is preferred for the second fastening device to project in cross section beyond the basic body of the holding device in order to form a stop for the holding device. One or more holding devices can thus be slid, via the first end and the first fastening device that is arranged there, onto the holding arrangement as far as the stop that is formed in this way.

Advantageously, the first fastening device interacts with a corresponding first mating fastening device formed on the framework or the like, and the second fastening device interacts with a corresponding second mating fastening device formed on the framework or the like, in order to fasten the holding arrangement to the framework or the like.

From a design point of view, it is preferred for the second mating fastening device to be formed at least one portion of the framework, at which the first mating fastening device is likewise formed. This results in an overall very flexible arrangement, since both the first and the second fastening device of the holding arrangement can be attached to the at least one portion of the framework.

Preferably, the framework has two bars which are arranged parallel to one another and the spacing of which corresponds substantially to the length of the holding arrangement. The two bars provide a simple way of fastening the holding arrangement. The bars can in this case form part of a larger unit, such as a frame, for example. However, the two bars can in principle also be fastened in a case or the like.

The first mating fastening device is advantageously realized by a recess formed in the bar, wherein the recess is preferably in the form of a longitudinal slot. As a result, in particular the production of the first mating fastening device of the framework is simplified and the costs therefor reduced.

Advantageously, in an intended installation position of the holding arrangement, the recess is formed on the inside, facing said holding arrangement, of the bar. In order that a sufficient clamping action is exerted on the first fastening device of the holding arrangement, it is preferred for the recess to taper towards the inside. Preferably, the recess has a substantially wedge-shaped cross-sectional profile.

Advantageously, the second mating fastening device has an outside of the bar. It is furthermore preferred for the longitudinal-sectional profile of the second fastening device to be complementary to the cross-sectional profile of the bar. The two mating fastening devices can therefore be formed independently of one another on the bars and one mating fastening device does not impair the operation of the other in each case.

According to a preferred embodiment of the invention, the holding device has two portions, wherein a first portion of the holding device is provided to fasten the holding device to the holding arrangement, and wherein the second portion of the holding device is provided to hold the at least one object.

Preferably, the first portion of the holding device is formed in the manner of a sleeve, wherein advantageously the first portion of the holding device has an opening for sliding the holding device onto the holding arrangement by way of its first end.

In order for it to be possible to push the holding device onto the holding arrangement, it is preferred for the cross-sectional profile of the opening to correspond substantially to the cross-sectional profile of the holding arrangement. However, in this case, the opening has a portion which protrudes inwards and is formed in a preferably convex manner, in order to provide a clamping action of the first portion of the holding device on the holding arrangement.

It is furthermore preferred for the second portion of the holding device to have at least two holding arms for holding the at least one object, said holding arms being arranged on opposite sides of the second portion of the holding device. This results in a secure and space-saving arrangement, in that the at least two holding arms are arranged in an offset manner with respect to one another. In this case, the at least two holding arms are preferably offset with respect to one another parallel to a longitudinal direction of the second portion of the holding arrangement such that, in the intended installation position with two holding devices fitted directly adjacent to one another on the holding arrangement, the holding arms of a first of the holding devices are arranged in a staggered manner with respect to the holding arms of the second of the holding devices.

Advantageously, at least one of the at least two holding arms has at least one first portion which is curved inwards in a substantially circular form. This configuration is particularly suitable for retaining objects having a round cross section.

It is furthermore particularly preferred for the second portion of the holding device to have four or six holding arms. Four holding arms are in this case preferably provided for holding an object, for example an ampoule, and six holding arms for holding two objects, for example two ampoules located one above the other.

To achieve a particularly good retaining means, it is preferred for the second portion of the holding device to have a two-dimensional contact region for the object to be held. In this case, the two-dimensional contact region is preferably arranged between the holding arms. Preferably, the two-dimensional contact region is arranged between the first portions of the holding arms, and wherein the two-dimensional contact region together with the first portions of the holding arms has a cross-sectional profile substantially in the form of a circular portion. Particularly stable fastening results when the circular-portion form is somewhat more than a semicircle.

In order to obtain greater variability of the arrangement, and in particular also to use one holding device to accommodate more than one object, it is preferred for the holding arms furthermore to have at least a second portion for holding at least a second object. In this case, the second portion of the holding arms is preferably curved inwards in a substantially circular form and preferably adjoins the first portion of the holding arms.

In order to provide more space for the retaining means for the at least one object, it is preferred from a design point of view for the second portion of the holding device to protrude beyond the first portion of the holding device.

According to a preferred variant of the invention, which is particularly suitable for objects having unusual shapes and dimensions, it is preferred for an elastic band for holding the at least one object to be fastened to the second portion of the holding device.

The framework preferably has two bars which are arranged parallel to one another. It is furthermore preferred for the framework to have at least a first substantially rectangular frame, which is formed by the two bars that are arranged parallel to one another in the longitudinal direction and also by two transverse bars that are fastened thereto by means of four angle pieces. The framework is preferably constructed in a modular manner and has at least one further substantially rectangular frame, wherein the at least one further frame is fastened to the first frame by spacers.

In order to further improve the flexibility of the arrangement, it is preferred for the at least one further frame to be fastened to the first frame such that it can be pivoted or folded open. Likewise, for production reasons and in order to simplify operation, it is preferred for the components of the framework to be fastened detachably together by a plug connection.

Further preferred embodiments of the invention are disclosed in the dependent claims.

BRIEF DESCRIPTION OF THE DRAWINGS

The invention, and also further features, aims, advantages and possible uses thereof, is or are explained in more detail in the following text on the basis of a description of preferred exemplary embodiments with reference to the attached drawings. In the drawings, the same reference signs designate the same or corresponding elements. In this case, all the features described and/or depicted form, separately or in any sensible combination, the subject matter of the present invention, and specifically independently of their summary in the claims or the back-references thereto. In the drawings:

DETAILED DESCRIPTION OF THE PREFERRED EMBODIMENTS

Figure 1A:
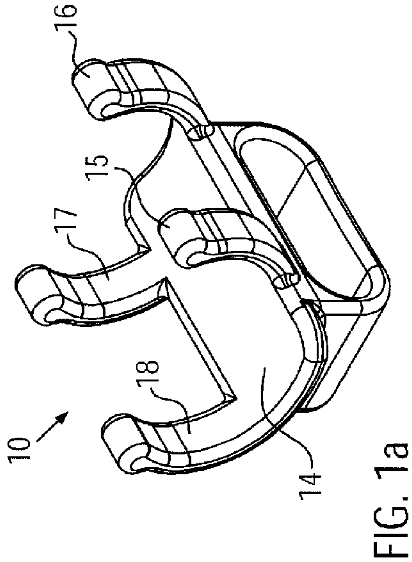
FIGS. 1*a* to 1*d* show schematic illustrations of a first exemplary embodiment of a holding device according to the invention for holding at least one object, for example an ampoule, with FIG. 1*a* showing a perspective view, FIG. 1*b* a front view, FIG. 1*c* a side view and FIG. 1*d* a top view.
Figure 1B:
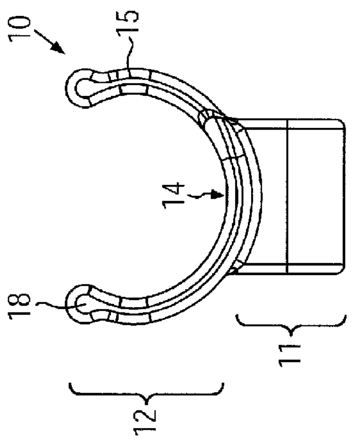
Figure 1C:
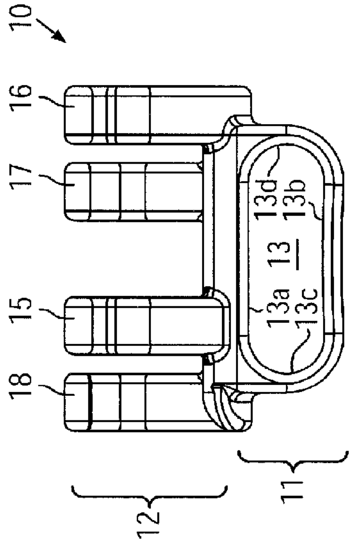
Figure 1D:
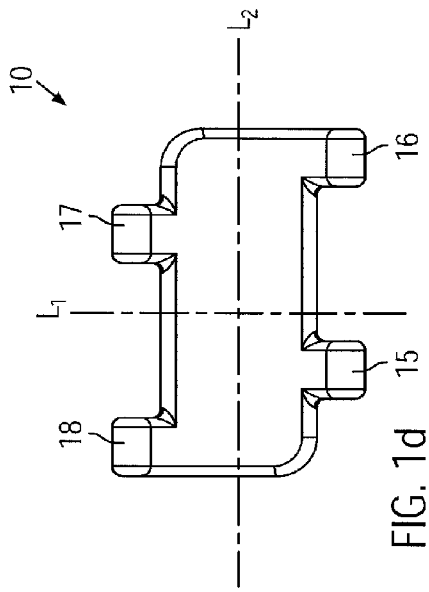
Figure 2B:
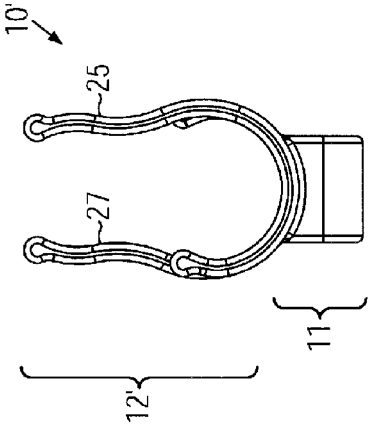
FIGS. 2*a* to 2*d* show schematic illustrations of a second exemplary embodiment of a holding device according to the invention for holding at least one object, e.g. two ampoules, with FIG. 2*a* showing a perspective view, FIG. 2*b* a front view, FIG. 2*c* a side view and FIG. 2*d* a top view.
Figure 2D:
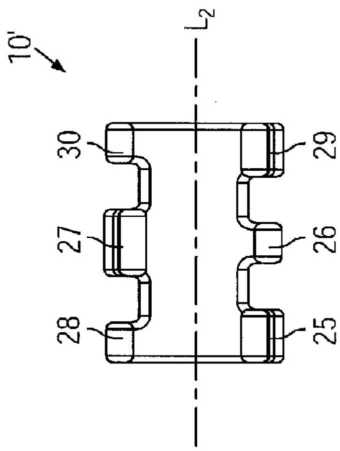
Figure 2A:
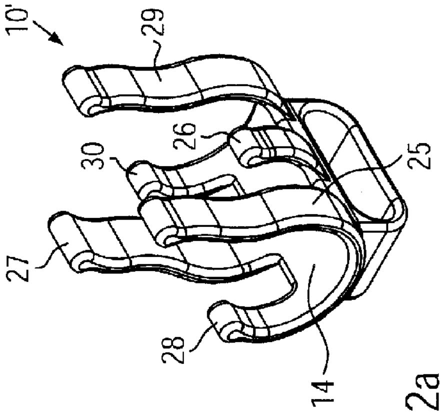
Figure 2C:
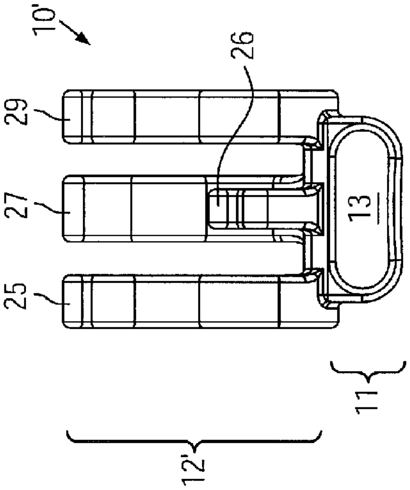
Figure 3A:
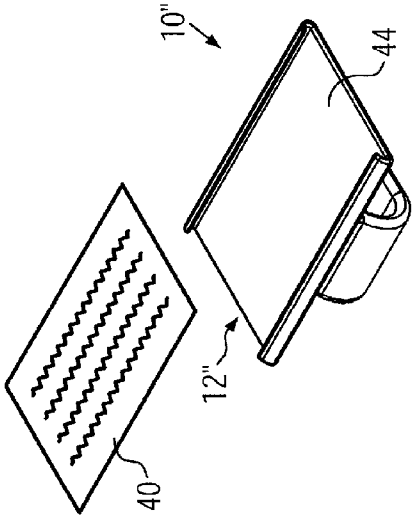
FIGS. 3*a* to 3*d* show schematic illustrations of a third exemplary embodiment of a holding device according to the invention for holding at least one object, for example a sign, with FIG. 3*a* showing a perspective view, FIG. 3*b* a front view, FIG. 3*c* a side view and FIG. 3*d* a top view.
Figure 3B:
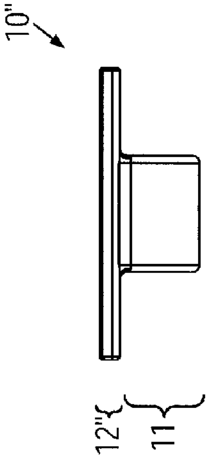
Figure 3C:
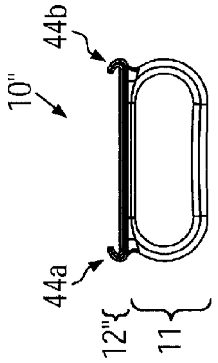
Figure 3D:
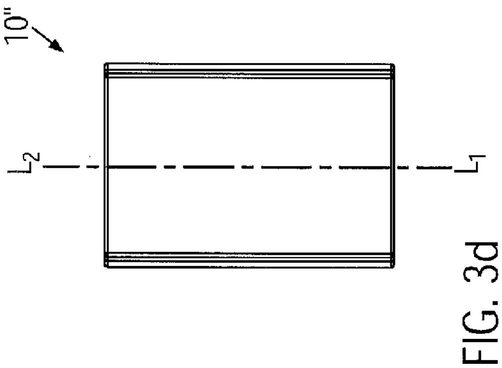

A first exemplary embodiment of a holding device or holder 10 according to the invention is explained in more detail in the following text on the basis of FIGS. 1*a*-1*d*. The holding device 10 has a first portion or part 11 and a second portion or part 12. According to the illustration in FIGS. 1*a*-1*d*, the first portion 11 is formed under the second portion 12. The two portions 11, 12 each have longitudinal axes $L_1$ and $L_2$, respectively, which are arranged in a manner offset through 90 degrees with respect to one another (cf. FIG. 1*d*). The first portion 11 is configured in a substantially sleeve-like manner in order that the holding device 10 according to the invention can be pushed onto a holding arrangement or holding strip or holding bar 1 (cf. FIG. 4). It is clearly apparent from the illustration in FIG. 1*c* that the first portion 11 has a recess or opening 13, which has a constant cross-sectional profile having a substantially oval shape over the length of the first portion 1. The recess or opening 13 has a first inner wall 13*a*, which adjoins the second portion 12 and is formed in a planar manner. Opposite the inner wall 13*a*, i.e. at the end of the opening 13 that is remote from the second portion 12 of the holding device 10, there is provided a second inner wall 13*b*. It is clearly apparent from the illustration in FIG. 1*c* that the second inner wall 13*b*, which is opposite the first inner wall 13*a*, protrudes inwardly towards the middle and is therefore formed in a slightly convex manner. This configuration of the second inner wall 13*b* ensures that a clamping action is achieved when the holding device 10 is pushed onto a holding arrangement 1 (cf. FIG. 4) by means of the first portion 11. The holding device 10 is thus fixed to a certain degree on the holding arrangement, and so, although it is possible for the holding device 10 to be slid onto and displaced on the holding arrangement 1 (cf. FIG. 4), it is not possible for a holding device 10 pushed onto the holding arrangement to slip by itself. The holding device 10 is formed so to speak as a tab. In addition to the two inner walls 13*a*, 13*b*, the opening 13 has two substantially semicircular inner walls 13*c* and 13*d* which are likewise arranged opposite one another. The second portion 12 of the holding device 10 serves to accommodate or fasten an object having an approximately circular cross section, for example an ampoule or the like. To this end, the second portion 12 has a two-dimensional contact region 14. It is clearly apparent from FIG. 1*c* that the two-dimensional contact region 14 and thus the second portion 12 projects beyond the first portion 11 at both ends in the direction of the longitudinal axis $L_2$. It is apparent from the illustration in FIG. 1*b* that the cross-sectional profile of the two-dimensional contact region 14 has the form of a circular portion, which substantially corresponds to that of the ampoule to be held. In the exemplary embodiment shown, four holding arms 15, 16, 17 and 18 project from the two-dimensional contact region 14. In this case, the holding arms 15 and 16 are provided on one longitudinal side of the two-dimensional contact region 14, while the two other holding arms 17 and 18 are formed on the opposite longitudinal side of the two-dimensional contact region 14. The holding arms 16 and 17 and 15 and 18, respectively, are located opposite one another but are arranged in an offset manner with respect to one another by approximately the thickness of one of the holding arms in the direction of the longitudinal axis $L_2$. This is clearly apparent from the illustration in FIGS. 1*c* and 1*d*. Basically, the holding arms 15-18 are formed in an identical manner and have likewise a circular-portion form (cf. FIG. 1*b*), corresponding to the circular-portion form of the two-dimensional contact region 14 and thus of the ampoule (not shown) to be accommodated, and so, by way of the two-dimensional contact region 14 and also the holding arms 15-18, more than half the circumference of an ampoule is held and fixed in the state in which said ampoule is inserted into the second portion 12 of the holding device 10. The holding arms 15-18 therefore continue the two-dimensional contact region 14 upwardly in an interrupted manner. The holding device 10 is preferably produced in one piece from a plastics material and the holding arms 15-18 afford, on account of their resilient action, a secure hold for an ampoule (not shown) inserted into the second portion 12 of the holding device 10. The offset arrangement of the holding arms 15, 18 and 16, 17 arranged respectively opposite one another serves both to provide a secure hold for the ampoule and also to provide a particularly space-saving possible way of arranging different holding devices 10 tightly next to one another in a row on the holding arrangement 1 (cf. FIGS. 4 and 5). This is based on the fact that the holding arms 17 and 18 of a second holding device 10 can be located next to the holding arms 15 and 16 of a first holding device 10 so that the spacing between two ampoules accounts for the thickness of just one of the holding arms, whereas if the holding arms were arranged such that they are not offset, this would result in a minimum spacing of twice the thickness of a holding arm.

Although ampoules are not standardized, there are basically three different basic sizes of ampoule, with, according to the invention, three holding devices 10 formed with different sizes being provided in a manner corresponding to these basic sizes. In this case, the design of the first portion 11 does not distinguish between these holding devices 10 which are formed differently with regard to size; however, the respective second portions 12, i.e. in particular the two-dimensional contact region 14 and the holding arms, of these holding devices 10 which are formed differently with regard to size are formed in a manner corresponding to the different sizes of the ampoules, and so, according to the invention, ampoules of different sizes can also be arranged alongside one another (cf. FIG. 5). For particularly large ampoules or ampoules having particularly unusual shapes, in one exemplary embodiment (not illustrated) there can be provided a variant of a holding device 10 which, instead of the holding arms 15-18, has slots on the two opposite longitudinal sides of the two-dimensional contact region 14, an elastic rubber band being guided through said slots. In this variant of the invention, the ampoule is then pushed into the rubber band and the rubber band can be tightened to improve the fastening. The ampoule is then pressed by the rubber band against the two-dimensional contact region and held firmly.

In conjunction with FIGS. 2*a*-2*d*, a second exemplary embodiment of a holding device 10' according to the invention is explained in more detail in the following text. The second exemplary embodiment illustrated in FIGS. 2*a*-2*d* is generally similar to the first exemplary embodiment already described in conjunction with FIGS. 1*a*-1*d*. In particular, the design of the first portions 11 of the holding devices 10, 10' according to the invention is identical. However, the two exemplary embodiments of the holding devices 10, 10' differ with regard to the structure of the second portion 12 and 12', respectively. The second portion 12' of the holding device 10' has a total of six holding arms 25-30. Three of the holding arms, namely the holding arms 25, 26 and 29, are arranged on one longitudinal end side of the two-dimensional contact region 14, while the three remaining holding arms 27, 28 and 30 are arranged on the opposite longitudinal end side of the two-dimensional contact region 14. In contrast to the first exemplary embodiment, the holding arms in the case of the holding device 10' according to the invention are arranged in accordance with the second exemplary embodiment without an offset with respect to one another in the direction of the longitudinal axis $L_2$. It is clearly apparent from the illustrations in FIGS. 2*a* and 2*d* that the holding arms 25 and 28, 26 and 27, 29 and 30 are in each case opposite one another without an offset. However, the holding arms 25-30 of the second exemplary embodiment of the holding device 10' according to the invention are not all the same length. It is clearly apparent from FIG. 2*a* that the holding arms 25, 27 and 29 are more than twice as long as the other holding arms 26, 28 and 30. In this case, they are arranged such that in each case one short holding arm is opposite a long holding arm. The short holding arm 28 is located opposite the long holding arm 25, the long holding arm 27 is located opposite the short holding arm 26 and the short holding arm 30 is located opposite the long holding arm 29. Since two long holding arms, namely the holding arms 25 and 29, are arranged on one longitudinal end side of the two-dimensional contact region, whereas only one long holding arm, namely the holding arm 27, is arranged on the other longitudinal end side of the two-dimensional contact region 14, an asymmetrical arrangement of short and long holding arms is achieved overall. Thus, while the holding arms are generally not offset with respect to one another, the long holding arms and the short holding arms are, however, respectively offset. The primary purpose of the long holding arms 27, 29 and 30 is to additionally retain a further ampoule by means of the holding device 10' according to the invention of the second exemplary embodiment. The lengthening or extension of the long holding arms 27, 29 and 30 makes it possible, when an ampoule has already been inserted into the holding device 10' according to the invention and is received there by all six holding arms 25-30, also to fit a second ampoule on top, said second ampoule then being held merely by the three remaining long holding arms 25, 27 and 29. In this case, the second, outer ampoule also rests on the first, inner ampoule. The holding arms 25, 27 and 29 have a first portion (cf. FIG. 2*b*), which is formed in a manner generally corresponding in short holding arms 26, 28 and 30. However, in the case of the long holding arms 25, 27 and 29, this first portion is followed by an extension in the form of a second portion, which first of all extends inwards so as then to have a further circular-portion form which rests laterally against the second ampoule to be accommodated. On account of the fact that this extension is guided inwards, a better holding effect for the second ampoule is achieved.

With reference to FIGS. 3*a*-3*d*, a third exemplary embodiment of a holding device 10" according to the invention is described in more detail in the following text. The holding device 10", unlike in the first two exemplary embodiments, does not serve to hold an ampoule. Instead, the holding device 10" serves to accommodate, for example, a sign. In this case, the sign 40 is shown only in FIG. 3*a* in a state removed from the holding device 10". With regard to the structure, the first portion 11 of the holding device 10" is formed as in the two above-described exemplary embodiments. However, the second portion 12" has a rectangular plate 44, the longitudinal end sides 44*a* and 44*b* of which extend in an upwardly curved manner, i.e. away from the first portion 11. These bent longitudinal sides 44*a* and 44*b* guide and hold the sign 40, which is made of paper, cardboard or plastic and is simply slid or pushed in from the side. The plate 44 is oriented such that its longitudinal center axis $L_2$ is identical to the longitudinal center axis $L_1$ of the portion 11 (cf. FIG. 3*d*). According to the invention, it is possible to push not only holding devices 10, 10', which are provided here for holding the ampoules, onto the holding arrangements 1 according to the invention (cf. FIG. 4), but also holding arrangements for other objects, such as the above-described holding device 10", for example, which is provided for attaching a label. As a result, the arrangement is particularly clear and safe to handle.

Figure 4:
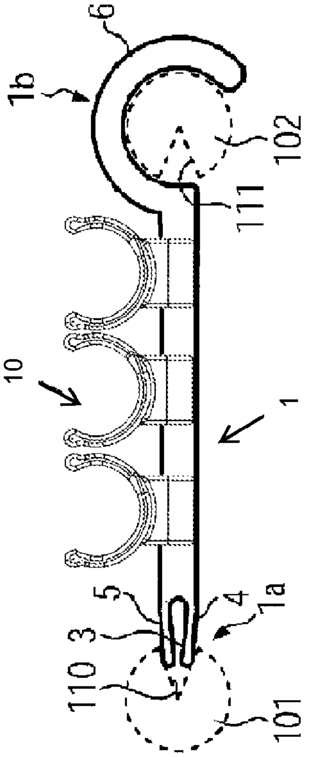
FIG. 4 shows a highly schematic and simplified illustration of a longitudinal section view of a first exemplary embodiment of a holding arrangement according to the invention, onto which the holding devices according to the exemplary embodiments shown in FIGS. 1*a* to 1*d*, 2*a* to 2*d* and 3*a* to 3*d* can be pushed.

By way of the highly schematic longitudinal section illustration in FIG. 4, an exemplary embodiment of the holding arrangement 1, which according to the invention is in the form of a guide or rail, is explained in more detail in the following text. The holding arrangement 1 has a substantially elongate basic body 2, which has a constant cross-sectional profile substantially over its entire length. In this case, the cross-sectional profile of the elongate basic body 2 of the holding arrangement 1 is complementary to that of the opening 13 in the holding devices 10, 10' and 10". The holding arrangement 1 has two opposite ends 1*a* and 1*b*. At the first end 1*a*, a first fastening device is provided by a material cutout in the form of a centrally arranged, thin slot 3 which is rectangular in cross section, thereby forming two tongues 4 and 5. It can be readily seen from the schematic longitudinal illustration in FIG. 4 that the external cross section of the first end 1*a* of the elongate basic body 2 corresponds to that of the holding arrangement 1. Via this first end 1*a*, the holding devices 10, 10' and 10" are pushed according to the invention onto the holding arrangement 1. The second end 1*b* has a different, extended external cross-sectional form and serves in particular as a stop, since the holding devices 10, 10' and 10" cannot be pushed over the second end 1*b* of the holding arrangement 1. Provided at the second end 1*b* is a second fastening device, which is formed as a clip 6 which is in the form of a circular portion in the exemplary embodiment illustrated. It is clearly apparent from the illustration in longitudinal section in FIG. 4 that the clip 6 extends upwards in the form of a circle from the elongate basic body 2 and then extends under the latter so that it is somewhat more than semicircular in longitudinal section. FIG. 4 likewise shows in dashed lines two parallel bars 101 and 102 which form a part of a framework 100, which will be explained in greater detail in conjunction with FIG. 6. The bar 101 has a cross-sectionally wedge-shaped recess 110 in its region facing the inside of the framework 100 or in a region facing the bar 102. In a corresponding manner, the bar 102 has a wedge-shaped recess 111 facing the bar 101. The first end 1*a* of the holding arrangement 1 having the first fastening device formed on it is arranged partially or completely in the wedge-shaped recess 110 of the bar 101 in the intended installation position. On account of the resilient action of the two tongues 4 and 5 which is provided by the slot 3, the holding arrangement 1 is fixed in its position. The actual fastening of the holding arrangement 1 to the framework 100 is ensured by the clip 6 being clamped around the external circumference of the bar 102. It is clearly apparent from the schematic illustration in FIG. 4 that the holding arrangement 1 can also be fastened the other way round, i.e. with swapped first and second ends 1*a*, 1*b*, to the two bars 101, 102 of the framework 100. In this case, the holding arrangement 1 can also be arranged on the other side on the bars 101, 102, i.e. with not just left and right being swapped but also top and bottom. This therefore results in a total of four possible ways of fastening the holding arrangement 1 to the two bars 101, 102, this contributing towards the particular flexibility of the system according to the invention.

Figure 5:
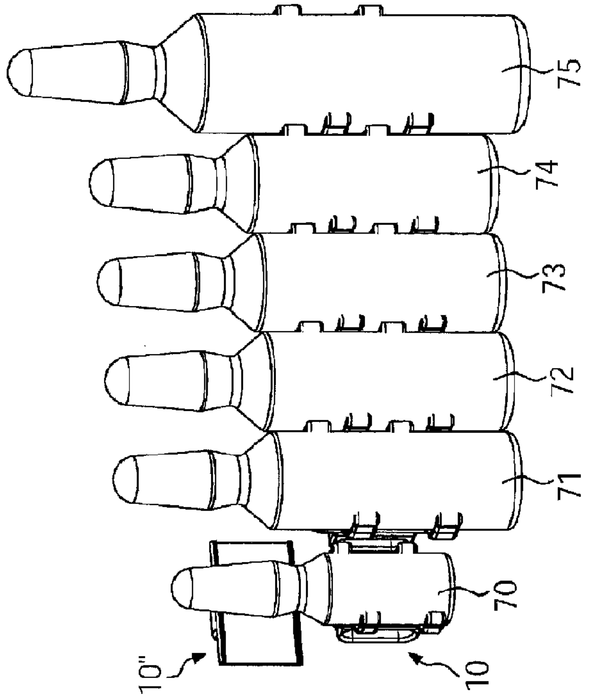
FIG. 5 shows a schematic illustration of a front view of a row of holding devices which are pushed onto a holding arrangement (not shown) according to the invention and to which ampoules are attached.

The schematic illustration in FIG. 5 shows an arrangement of ampoules 70, 71, 72, 73, 74 and 75 (for the sake of clarity, the holding arrangement 1 has been omitted to simplify the illustration) having different sizes, which are arranged tightly in a row next to one another. The ampoules can in this case have different sizes. Thus, for example, the ampoule designated 70 is a "small" ampoule, the ampoules designated 71-74 are "medium-sized" ampoules and a "large" ampoule is shown at 75. The holding arms of the holding device 10 can clearly be seen in FIG. 5 and it is also apparent that the spacing between in each case two of the ampoules, for example between the ampoules 71 and 72, corresponds to just the thickness of one holding arm on account of the offset arrangement of the holding arms in the first exemplary embodiment of a holding device 10 according to the invention. It is further apparent from FIG. 5 that a holding arrangement 10" (once again, the further holding arrangement 1 provided for this purpose is not shown in order to simplify the illustration) for labeling the ampoule 70 is arranged above the latter.

Figure 6:
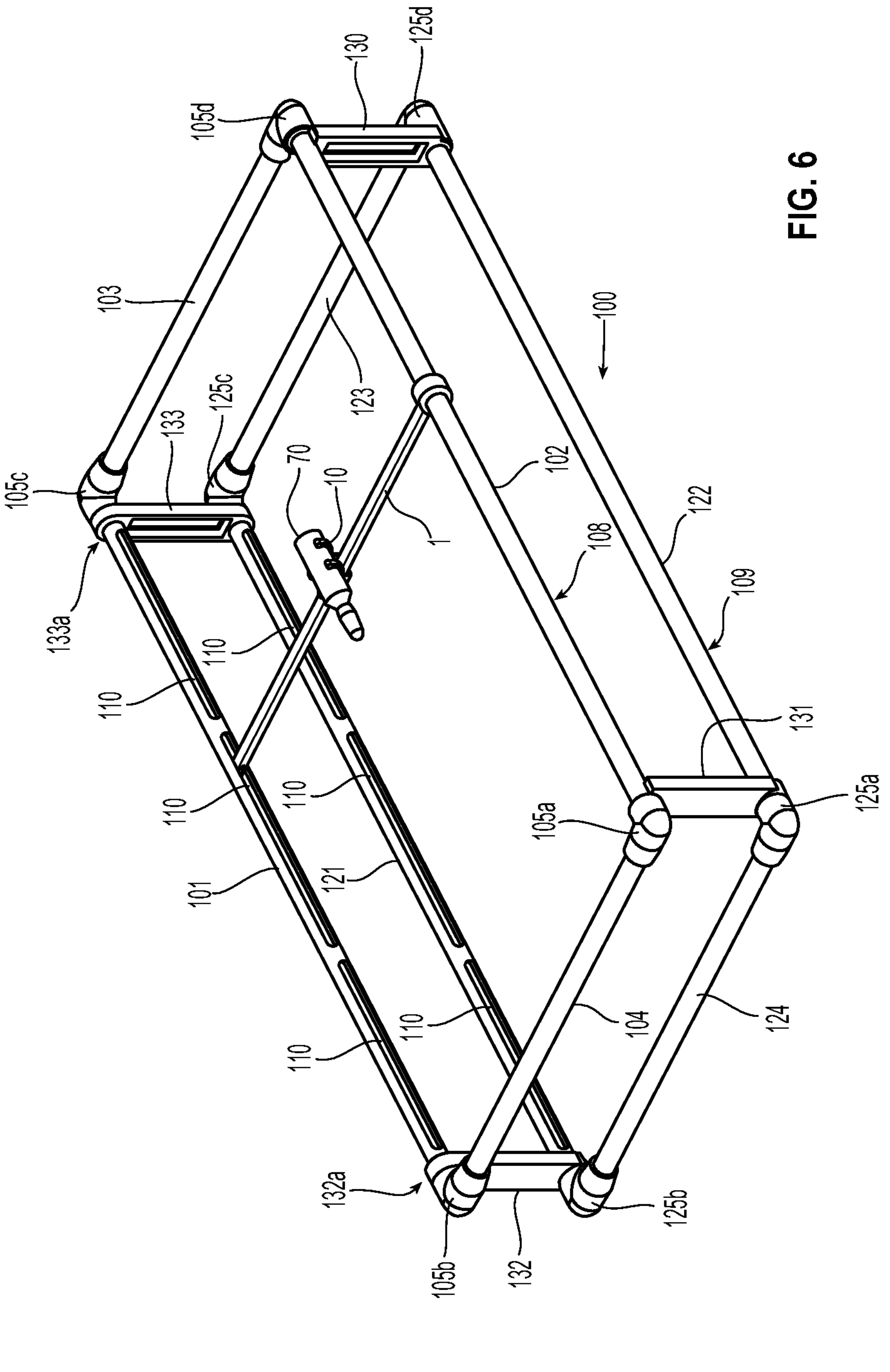
FIG. 6 shows a schematic illustration of an exemplary embodiment of a (holding) framework, to which one or more holding arrangement(s) according to FIG. 4 are or can be attached.

FIG. 6 schematically shows the structure of a framework 100 according to the invention, to which one or more holding arrangements 1, onto which holding devices 10, 10' and 10" are pushed, can be fastened. The framework 100 has two parallel bars 101 and 102, which are connected by transverse bars 103 and 104 by means of four angle pieces 105*a*-105*d* to form a first frame 108, which is rectangular in the exemplary embodiment. The first frame 108, which is formed by the longitudinal bars 101, 102 and the transverse bars 103, 104 and also the angle pieces 105*a*-105*d*, is already sufficient in one exemplary embodiment to form a framework 100 according to the invention. However, the two bars 101 and 102 could also be fastened for example in a case, so that their fixing and spacing is ensured by the bars 101 and 102 being fastened in a corresponding manner to the case. Therefore, the transverse bars and angle pieces are dispensable in this variant of the invention. However, in order to configure the structure of the invention in as flexible a manner as possible, a module structure is provided and illustrated in FIG. 6. To this end, the framework 100 has a second frame 109, which is formed in a manner corresponding to the first frame 108 by the longitudinal bars 121 and 122 to the transverse bars 123 and 124. Provided between the two frames 108, 109 are spacers in the form of transverse struts 130-133. The transverse struts 130 and 131 are in this case fastened to the bar 122, preferably formed integrally or in one piece with the angle pieces 125*d* and 125*a*, and the bar 102 rests on that end of the transverse struts 130 and 131 that is remote from the bar 122. By appropriate material selection and shaping of these remote ends of the transverse struts 130 and 131, it is also possible to achieve a clamping action of the bar 102 and thus stabilization of the framework 100. The two transverse struts 132 and 133 are preferably formed integrally or in one piece with the angle pieces 125*b* and 105*b*, and 125*c* and 105*c*, respectively, connect the two frames 108, 109 together and each have a joint 132*a* and 133*a*, so that the upper frame 108 can be folded open in the manner of a book. In this way, it is possible to attach corresponding holding arrangements 1 to both frames, and specifically with holding devices 10, 10' and 10" oriented both inwards and outwards on the holding arrangements 1. Furthermore, the holding arrangements 1 can be pushed in from the left or from the right and be clamped from above or below. The system according to the invention thereby achieves optimum flexibility with at the same time a stable and space-saving arrangement. The framework 100 is put into a bag when used, for example, it being possible for it to be held loosely in said bag or to be fastened therein. On account of the modular nature of the frame 100, it is also possible to fasten yet more frames (not shown) to it. Thus, while a "double-decker" arrangement is shown in the illustration in FIG. 6, it is possible also to provide single- or more than triple-decker arrangements, depending on the requirements. The framework 100 can therefore be easily taken apart into its individual parts and can be constructed in a large number of variants and be equipped as desired with holding arrangements onto which holding devices holding ampoules have been pushed, it being preferred to equip it in the manner of the printing of a book.

The invention was explained in more detail above on the basis of preferred embodiments thereof. However, it is obvious for a person skilled in the art that various developments and modifications can be made without deviating from the concept on which the invention is based.

The invention can also be summarized by the following sub-paragraphs:

1. A holding arrangement for at least one holding device for holding at least one object, characterized in that the at least one holding device for holding at least one object can be attached to the holding arrangement, and in that furthermore fastening means are formed on the holding arrangement in order to fasten the holding arrangement to a framework or the like.
2. The holding arrangement as claimed in claim 1, characterized in that the at least one object is an ampoule, a sign or the like.
3. The holding arrangement as claimed in claim 1 or 2, characterized in that the holding arrangement is in the form of a rail or guide.
4. The holding arrangement as claimed in one of claims 1 to 3, characterized in that the holding arrangement has a substantially elongate basic body.
5. The holding arrangement as claimed in claim 4, characterized in that the basic body of the holding arrangement has a constant cross-sectional profile substantially over its entire length.
6. The holding arrangement as claimed in claim 5, characterized in that the cross-sectional profile is one from the following group: a rectangle, a rectangle with rounded corners, an ellipse, a circle, a flattened circle.
7. The holding arrangement as claimed in one of claims 1 to 6, characterized in that the fastening means have first and second fastening devices, wherein the holding arrangement has two opposite, first and second ends, with the first end having the first fastening device and the second end having the second fastening device.
8. The holding arrangement as claimed in claim 7, characterized in that the first and second fastening devices are formed differently from one another.
9. The holding arrangement as claimed in one of claims 1 to 8, characterized in that the fastening of the holding arrangement to the framework or the like by the fastening means is detachable fastening.
10. The holding arrangement as claimed in one of claims 7 to 9, characterized in that the first fastening device is a fixing device.
11. The holding arrangement as claimed in one of claims 7 to 10, characterized in that the first fastening device has two tongues that are separated by a gap.
12. The holding arrangement as claimed in claim 11, characterized in that the gap is formed by a material cutout in the holding arrangement.
13. The holding arrangement as claimed in one of claims 7 to 12, characterized in that the cross-sectional profile of the first fastening device corresponds to that of the basic body of the holding arrangement.
14. The holding arrangement as claimed in one of claims 11 to 13, characterized in that the gap is rectangular in cross section.
15. The holding arrangement as claimed in one of claims 11 to 14, characterized in that the gap is arranged approximately centrally in the second end of the holding arrangement.
16. The holding arrangement as claimed in one of claims 7 to 15, characterized in that the second fastening device is one from the following group: a clamping fastening device, a clip, a clasp, a bracket or the like.
17. The holding arrangement as claimed in one of claims 7 to 16, characterized in that the second fastening device is a clip which is substantially in the form of a circular portion in longitudinal section.
18. The holding arrangement as claimed in claim 17, characterized in that the circular-portion form is somewhat more than a semicircle.
19. The holding arrangement as claimed in one of claims 7 to 18, characterized in that the second fastening device has a cross-sectional profile that differs from the cross-sectional profile of the basic body of the holding arrangement.
20. The holding arrangement as claimed in one of claims 7 to 19, characterized in that the second fastening device projects in cross section beyond the basic body of the holding device in order to form a stop for the holding device.
21. The holding arrangement as claimed in one of claims 7 to 20, characterized in that the first fastening device interacts with a corresponding first mating fastening device formed on the framework or the like, and in that the second fastening device interacts with a corresponding second mating fastening device formed on the framework or the like, in order to fasten the holding arrangement to the framework or the like.
22. The holding arrangement as claimed in claim 21, characterized in that the second mating fastening device is formed at at least one portion of the framework, at which the first mating fastening device is likewise formed.
23. The holding arrangement as claimed in one of claims 1 to 22, characterized in that the framework has two bars which are arranged parallel to one another and the spacing of which corresponds substantially to the length of the holding arrangement.
24. The holding arrangement as claimed in one of claims 21 to 23, characterized in that the first mating fastening device is a recess formed in the bar.
25. The holding arrangement as claimed in claim 24, characterized in that the recess is in the form of a longitudinal slot.
26. The holding arrangement as claimed in claim 24 or 25, characterized in that, in an intended installation position of the holding arrangement, the recess is formed on the inside, facing said holding arrangement, of the bar.
27. The holding arrangement as claimed in claim 26, characterized in that the recess tapers towards the inside.
28. The holding arrangement as claimed in claim 27, characterized in that the recess has a substantially wedge-shaped cross-sectional profile.
29. The holding arrangement as claimed in one of claims 21 to 28, characterized in that the second mating fastening device has an outside of the bar.
30. The holding arrangement as claimed in claim 29, characterized in that the longitudinal-sectional profile of the second fastening device is complementary to the cross-sectional profile of the bar.

31. The holding arrangement as claimed in claim 29 or 30, characterized in that the bar has a substantially circular cross-sectional profile.

32. The holding arrangement as claimed in one of claims 1 to 31, characterized in that the holding device has two portions, wherein a first portion of the holding device is provided to fasten the holding device to the holding arrangement, and wherein the second portion of the holding device is provided to hold the at least one object.

33. The holding arrangement as claimed in claim 32, characterized in that the first portion of the holding device is formed in the manner of a sleeve.

34. The holding arrangement as claimed in claim 32 or 33, characterized in that the first portion of the holding device has an opening for sliding the holding device onto the holding arrangement by way of its first end.

35. The holding arrangement as claimed in claim 34, characterized in that the cross-sectional profile of the opening corresponds substantially to the cross-sectional profile of the holding arrangement.

36. The holding arrangement as claimed in claim 34 or 35, characterized in that the opening has a portion which protrudes inwards and is formed in a preferably convex manner, in order to provide a clamping action of the first portion of the holding device on the holding arrangement.

37. The holding arrangement as claimed in one of claims 32 to 36, characterized in that the second portion of the holding device has at least two holding arms for holding the at least one object, said holding arms being arranged on opposite sides of the second portion of the holding device.

38. The holding arrangement as claimed in claim 37, characterized in that the at least two holding arms are arranged in an offset manner with respect to one another.

39. The holding arrangement as claimed in claim 38, characterized in that the at least two holding arms are offset with respect to one another parallel to a longitudinal direction of the second portion of the holding arrangement such that, in the intended installation position with two holding devices fitted directly adjacent to one another on the holding arrangement, the holding arms of a first of the holding devices are arranged in a staggered manner with respect to the holding arms of the second of the holding devices.

40. The holding arrangement as claimed in one of claims 37 to 39, characterized in that at least one of the at least two holding arms has at least one first portion which is curved inwards in a substantially circular form.

41. The holding arrangement as claimed in one of claims 37 to 40, characterized in that the second portion of the holding device has four or six holding arms.

42. The holding arrangement as claimed in one of claims 32 to 41, characterized in that the second portion of the holding device has a two-dimensional contact region for the object to be held.

43. The holding arrangement as claimed in claim 42, characterized in that the two-dimensional contact region is arranged between the holding arms.

44. The holding arrangement as claimed in claim 43, characterized in that the two-dimensional contact region is arranged between the first portions of the holding arms, and wherein the two-dimensional contact region together with the first portions of the holding arms has a cross-sectional profile substantially in the form of a circular portion.

45. The holding arrangement as claimed in claim 44, characterized in that the circular-portion form is somewhat more than a semicircle.

46. The holding arrangement as claimed in one of claims 37 to 45, characterized in that the holding arms furthermore have at least a second portion for holding at least a second object.

47. The holding arrangement as claimed in claim 46, characterized in that the second portion of the holding arms is curved inwards in a substantially circular form.

48. The holding arrangement as claimed in claim 47, characterized in that the second portion of the holding arms adjoins the first portion of the holding arms.

49. The holding arrangement as claimed in one of claims 32 to 48, characterized in that the second portion of the holding device has a two-dimensional contact region for the object to be held.

50. The holding arrangement as claimed in claim 49, characterized in that the second portion of the holding device protrudes beyond the first portion of the holding device.

51. The holding arrangement as claimed in one of claims 32 to 50, characterized in that an elastic band for holding the at least one object is fastened to the second portion of the holding device.

52. The holding arrangement as claimed in one of claims 32 to 51, characterized in that a guide for holding a sign is formed on the second portion of the holding device.

53. The holding arrangement as claimed in one of claims 1 to 52, characterized in that the holding arrangement and/or the holding device is/are formed integrally.

54. The holding arrangement as claimed in one of claims 1 to 53, characterized in that the holding arrangement and/or the holding device is/are produced from a plastics material.

55. The holding arrangement as claimed in one of claims 1 to 54, characterized in that the holding arrangement and/or the holding device is/are produced from an elastic material.

56. The holding arrangement as claimed in one of claims 1 to 55, characterized in that the framework has two bars that are arranged parallel to one another.

57. The holding arrangement as claimed in claim 56, characterized in that the framework has at least a first substantially rectangular frame, which is formed by the two bars that are arranged parallel to one another in the longitudinal direction and also by two transverse bars that are fastened thereto by means of four angle pieces.

58. The holding arrangement as claimed in claim 57, characterized in that the framework has at least one further substantially rectangular frame, wherein the at least one further frame is fastened to the first frame by spacers.

59. The holding arrangement as claimed in claim 58, characterized in that the at least one further frame is fastened to the first frame such that it can be pivoted or folded open.

60. The holding arrangement as claimed in one of claims 56 to 59, characterized in that the components of the framework are fastened detachably together by a plug connection.

61. A holding device for holding at least one object to be detachably fastened to a holding arrangement as claimed in one of claims 1 to 60.

62. The holding device for holding at least one object, in particular as claimed in claim 61, characterized in that the holding device has two portions, wherein a first portion of the holding device is provided to fasten the holding device to a holding arrangement, and wherein the second portion of the holding device is provided to hold the at least one object.

63. The holding device as claimed in claim 62, characterized in that the first portion of the holding device is formed in the manner of a sleeve.

64. The holding device as claimed in claim 62 or 63, characterized in that the first portion of the holding device has an opening for sliding the holding device onto the holding arrangement via its first end.

65. The holding device as claimed in claim 64, characterized in that the cross-sectional profile of the opening corresponds substantially to the cross-sectional profile of the holding arrangement.

66. The holding device as claimed in claim 64 or 65, characterized in that the opening has a portion which protrudes inwards and is formed in a preferably convex manner, in order to provide a clamping action of the first portion of the holding device on the holding arrangement.

67. The holding device as claimed in one of claims 61 to 66, characterized in that the second portion of the holding device has at least two holding arms for holding the at least one object, said holding arms being arranged on opposite sides of the second portion of the holding device.

68. The holding device as claimed in claim 67, characterized in that the at least two holding arms are arranged in an offset manner with respect to one another.

69. The holding device as claimed in claim 68, characterized in that the at least two holding arms are offset with respect to one another parallel to a longitudinal direction of the second portion of the holding arrangement such that, in the intended installation position with two holding devices fitted directly adjacent to one another on the holding arrangement, the holding arms of a first of the holding devices are arranged in a staggered manner with respect to the holding arms of the second of the holding devices.

70. The holding device as claimed in one of claims 67 to 69, characterized in that at least one of the at least two holding arms has at least one first portion which is curved inwards in a substantially circular form.

71. The holding device as claimed in one of claims 67 to 70, characterized in that the second portion of the holding device has four or six holding arms.

72. The holding device as claimed in one of claims 61 to 71, characterized in that the second portion of the holding device has a two-dimensional contact region for the object to be held.

73. The holding device as claimed in claim 72, characterized in that the two-dimensional contact region is arranged between the holding arms.

74. The holding device as claimed in claim 73, characterized in that the two-dimensional contact region is arranged between the first portions of the holding arms, and wherein the two-dimensional contact region together with the first portions of the holding arms has a cross-sectional profile substantially in the form of a circular portion.

75. The holding device as claimed in claim 74, characterized in that the circular-portion form is somewhat more than a semicircle.

76. The holding device as claimed in one of claims 67 to 75, characterized in that the holding arms furthermore have at least a second portion for holding at least a second object.

77. The holding device as claimed in claim 76, characterized in that the second portion of the holding arms is curved inwards in a substantially circular form.

78. The holding device as claimed in claim 77, characterized in that the second portion of the holding arms adjoins the first portion of the holding arms.

79. The holding device as claimed in one of claims 61 to 78, characterized in that the second portion of the holding device has a two-dimensional contact region for the object to be held.

80. The holding device as claimed in claim 79, characterized in that the second portion of the holding device protrudes beyond the first portion of the holding device.

81. The holding device as claimed in one of claims 61 to 80, characterized in that an elastic band for holding the at least one object is fastened to the second portion of the holding device.

82. The holding device as claimed in one of claims 61 to 81, characterized in that a guide for holding a sign is formed on the second portion of the holding device.

83. A framework, to which at least one holding arrangement as claimed in one of claims 1 to 60 is intended to be fastened.

84. The framework, in particular as claimed in claim 83, characterized in that the framework has two bars which are arranged parallel to one another.

85. The framework as claimed in claim 84, characterized in that the framework has at least a first substantially rectangular frame, which is formed by the two bars that are arranged parallel to one another in the longitudinal direction and also by two transverse bars that are fastened thereto by means of four angle pieces.

86. The framework as claimed in claim 85, characterized in that the framework has at least one further substantially rectangular frame, wherein the at least one further frame is fastened to the first frame by spacers.

87. The framework as claimed in claim 86, characterized in that the at least one further frame is fastened to the first frame such that it can be pivoted or folded open.

88. The framework as claimed in one of claims 83 to 87, characterized in that the components of the framework are fastened detachably together by a plug connection.

89. The framework as claimed in one of claims 83 to 88, characterized in that the first fastening device of the holding arrangement interacts with a corresponding first mating fastening device formed on the framework or the like, and in that the second fastening device of the holding arrangement interacts with a corresponding second mating fastening device formed on the framework or the like, in order to fasten the holding arrangement to the framework or the like.

90. The framework as claimed in claim 89, characterized in that the second mating fastening device is formed at at least one portion of the framework, at which the first mating fastening device is likewise formed.

91. The framework as claimed in one of claims 83 to 90, characterized in that the framework has two bars which are arranged parallel to one another and the spacing of which corresponds substantially to the length of the holding arrangement.

92. The framework as claimed in one of claims 89 to 91, characterized in that the first mating fastening device is a recess formed in the bar.

93. The framework as claimed in claim 92, characterized in that the recess is in the form of a longitudinal slot.

94. The framework as claimed in claim 92 or 93, characterized in that, in an intended installation position of the holding arrangement, the recess is formed on the inside, facing said holding arrangement, of the bar.

95. The framework as claimed in claim 94, characterized in that the recess tapers towards the inside.

96. The framework as claimed in claim 95, characterized in that the recess has a substantially wedge-shaped cross-sectional profile.

97. The framework as claimed in one of claims 89 to 96, characterized in that the second mating fastening device has an outside of the bar.

98. The framework as claimed in claim 97, characterized in that the longitudinal-sectional profile of the second fastening device is complementary to the cross-sectional profile of the bar.

99. The framework as claimed in claim 97 or 98, characterized in that the bar has a substantially circular cross-sectional profile.

100. A system for holding objects, having a holding arrangement as claimed in one of claims 1 to 60, a holding device as claimed in one of claims 61 to 82 and a framework as claimed in one of claims 83 to 99.

LIST OF REFERENCE SIGNS

1 Holding arrangement
1*a* First end of the holding arrangement
1*b* Second end of the holding arrangement
3 Gap
4, 5 Tongues
6 Clip
10, 10', 10" Holding device
11 First portion of the holding device
12 Second portion of the holding device
13 Opening
13*a*, 13*b*, 13*c*, 13*d* (Inner) wall
14 (Two-dimensional) contact region
15, 16, 17, 18 Holding arms of the holding device
25, 26, 27, 28, 29, 30 Holding arms of the holding device
40 Sign
44 Plate
70 Small ampoule
71, 72, 73, 74 Medium-sized ampoule
75 Large ampoule
100 Framework
101, 102 Long bars
103, 104 Short transverse bars
105*a*, 105*b*, 105*c*, 105*d* Angle pieces
108 First frame
109 Second frame
121, 122 Long bars
123, 124 Short transverse bars
130, 131, 132, 133 Transverse struts
132*a*, 133*a* Joint
125*a*, 125*b*, 125*c*, 125*d* Angle pieces

The invention claimed is:

1. A holding system comprising:

at least one holding arrangement, wherein the at least one holding arrangement comprises an elongated body, a first fastener disposed at a first end of the elongated body and a second fastener disposed at a second end of the elongated body, wherein the at least one holding arrangement is attached to a framework by the first and second fasteners, wherein the first fastener comprises a pair of tongues separated by a gap at the first end of the elongated body and the first fastener is releasably received by a recess in the framework wherein the second fastener serves as a stop and is formed as a clip, wherein a fastening of the holding arrangement to the framework is ensured by the clip, wherein the at least one holding arrangement is slidable relative to the framework, and a plurality of holding devices comprising at least a first holding device to receive and hold at least one first ampoule and at least a second holding device to receive and hold at least one second ampoule, wherein the first and the second holding device comprises each a first portion and a second portion, wherein the first portion and the second portion of the first holding device are connected to each other, and wherein the first portion and the second portion of the second holding device are connected to each other wherein the second end of the holding arrangement is enlarged to stop the plurality of holding devices comprising at least the first holding device and the second holding device from being pushed over the second end, wherein the first portion of the first holding device is received and retained by the at least one holding arrangement, wherein the second portion of the first holding device comprises a plurality of first upstanding arms disposed on a first and a second side of the first holding device, said first upstanding arms receive and hold the at least one first ampoule wherein the first portion of the second holding device is received and retained by the at least one holding arrangement, and wherein the second portion of the second holding device comprises a plurality of second upstanding arms disposed on a first and a second side of the second holding device, said second upstanding arms receive and hold the at least one second ampoule.

2. The holding system of claim 1, wherein the clip of the second fastener is adapted to releasably connected to the framework.

3. The holding system of claim 1, wherein the first portion has a first longitudinal axis and the second portion has a second longitudinal axis and the axes are offset through about 90 degrees with respect to one another.

4. A holding system comprising:

at least one holding arrangement, wherein the at least one holding arrangement comprises an elongated body, a first fastener disposed at a first end of the elongated body and a second fastener disposed at a second end of the elongated body, wherein the at least one holding arrangement is attached to a framework by the first and second fasteners, wherein the first fastener comprises a pair of tongues separated by a gap at the first end of the elongated body and the first fastener is releasably received by a recess in the framework, wherein the tongues are formed by a material cut-out in the form of a centrally arranged thin slot and wherein the tongues move toward each other to narrow the gap to be inserted to said recess, wherein the at least one holding arrangement is slidable relative to the framework, and a plurality of holding devices, wherein each holding device is adapted to hold at least one ampoule, wherein at least one holding device comprises a first portion and a second portion connected to each other, wherein the first portion is received and retained by the at least one holding arrangement, and wherein the second portion comprises a plurality of upstanding arms disposed on a first and a second side of the at least one holding device, said upstanding arms receive and hold the at least one ampoule.

5. The holding system of claim 4, wherein the plurality of holding devices comprising at least a first holding device to receive and hold at least one first ampoule and at least a second holding device to receive and hold at least one second ampoule, wherein the first and the second holding device comprise each a first portion and a second portion, wherein the first portion and the second portion of the first holding device are connected to each other, and wherein the first portion and the second portion of the second holding device are connected to each other, wherein the first portion of the first holding device and the first portion of the second holding are received and retained by the at least one holding arrangement, and wherein the first and the second holding device are slidable relative to the at least one holding arrangement, wherein the second portion of the first holding device comprises a plurality of first upstanding arms, wherein at least two first upstanding arm are disposed on a first side of the first holding device and wherein at least one first upstanding arm is disposed on a second side of the first holding device, wherein the plurality of first upstanding alms are formed to receive and hold the at least one first ampoule, wherein the second portion of the second holding device comprises a plurality of second upstanding arms, wherein at least one second upstanding arm is disposed on a first side of the second holding device and wherein at least one second upstanding arm is disposed on a second side of the second holding device, wherein the plurality of second upstanding arms are formed to receive and hold the at least one second ampoule, wherein the first side of the first holding device and the second side of the second holding device face each other on the at least one holding arrangement and wherein the at least two first upstanding arms on the first side of the first holding device are arranged in an offset manner with respect to the at least one second upstanding arm on the second side of the second holding device, wherein the first upstanding arms on the first side of the first holding device are each linearly offset from the first upstanding arm on the second side of the first holding device, and wherein the at least one second upstanding arm on the second side of the second holding device is positioned in a first linear arrangement between the at least two first upstanding arms on the first side of the first holding device.

6. The holding system of claim 4, wherein the plurality of holding devices comprising at least a first holding device to receive and hold at least one first ampoule and at least a second holding device to receive and hold at least one second ampoule, wherein the first and the second holding device comprise each a first portion and a second portion, wherein the first portion and the second portion of the first holding device are connected to each other, and wherein the first portion and the second portion of the second holding device are connected to each other, wherein the first and the second portion of each holding device each have a first longitudinal axis and a second longitudinal axis, which longitudinal axes are arranged in a manner offset through 90 degrees with respect to one another, wherein the first portion of each holding device comprises an opening, which takes the form of a sleeve, said sleeve comprises an inwardly convex portion wherein said convex portion contacts the at least one holding arrangement to retain the first and the second holding device to said at least one holding arrangement such that the first and the second holding device are slidable relative to the at least one holding arrangement against the contact between the convex portion and the at least one holding arrangement, wherein the convex portion of each holding device is in contact with the at least one holding arrangement and wherein the convex portion is arranged outside of the at least one holding arrangement opposite of the holding device, wherein the sleeve of the first portion of each holding device completely extends around the at least one holding arrangement, wherein the second portion of the first holding device comprises a plurality of first upstanding arms disposed on a first and a second side of the first holding device, said first upstanding arms receive and hold at least one first ampoule, and wherein the second portion of the second holding device comprises a plurality of second upstanding arms disposed on a first and a second side of the first holding device, said second upstanding arms receive and hold at least one second ampoule.

7. The holding system of claim 4, wherein the second fastener at the second end of the holding arrangement serves as a stop and is formed as a clip, wherein a fastening of the holding arrangement to the framework is ensured by the clip, and wherein the plurality of holding devices comprising at least a first holding device to receive and hold at least one first ampoule and at least a second holding device to receive and hold at least one second ampoule, wherein the first and the second holding device comprises each a first portion and a second portion, wherein the first portion and the second portion of the first holding device are connected to each other, and wherein the first portion and the second portion of the second holding device are connected to each other, wherein the second end of the holding arrangement is enlarged to stop the plurality of holding devices comprising at least the first holding device and the second holding device from being pushed over the second end, wherein the first portion of the first holding device is received and retained by the at least one holding arrangement, wherein the second portion of the first holding device comprises a plurality of first upstanding arms disposed on a first and a second side of the first holding device, said first upstanding arms receive and hold the at least one first ampoule, wherein the first portion of the second holding device is received and retained by the at least one holding arrangement, and wherein the second portion of the second holding device comprises a plurality of second upstanding arms disposed on a first and a second side of the second holding device, said second upstanding arms receive and hold the at least one second ampoule.

8. The holding system of claim 4, wherein all holding devices of the plurality of holding devices have an identical shape.

9. The holding system of claim 4, wherein the holding system is utilized in the field of emergency medicine.

10. The holding system of claim 4, wherein at least one holding device has a first and a second longitudinal axis, which axes are offset through 90 degrees to each other, wherein one of the longitudinal axes of the at least one holding device is arranged in a manner offset through 90 degrees with respect to an elongation axis of the at least one holding arrangement.

* * * * *